United States Patent
Li et al.

(10) Patent No.: US 10,971,156 B2
(45) Date of Patent: *Apr. 6, 2021

(54) METHOD, INTERACTION DEVICE, SERVER, AND SYSTEM FOR SPEECH RECOGNITION

(71) Applicant: Huawei Technologies Co., Ltd., Shenzhen (CN)

(72) Inventors: Shanfu Li, Shenzhen (CN); Mingjie Dong, Shenzhen (CN)

(73) Assignee: Huawei Teciinologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,872

(22) Filed: Jan. 24, 2019

(65) Prior Publication Data

US 2019/0156833 A1 May 23, 2019

Related U.S. Application Data

(63) Continuation of application No. 14/792,502, filed on Jul. 6, 2015, now Pat. No. 10,229,684, which is a
(Continued)

(30) Foreign Application Priority Data

Jan. 6, 2013 (CN) .......................... 201310003504.4

(51) Int. Cl.
*G10L 15/22* (2006.01)
*G10L 15/26* (2006.01)
(Continued)

(52) U.S. Cl.
CPC .............. *G10L 15/26* (2013.01); *G06F 40/30* (2020.01); *G10L 15/1822* (2013.01);
(Continued)

(58) Field of Classification Search
CPC combination set(s) only.
See application file for complete search history.

(56) References Cited

U.S. PATENT DOCUMENTS 6,195,636 B1 * 2/2001 Crupi ...................... G10L 15/30
704/201
6,748,361 B1 * 6/2004 Comerford ............. G10L 15/28
704/275
(Continued)

FOREIGN PATENT DOCUMENTS

CN 1389852 A 1/2003
CN 101067780 A 11/2007
(Continued)

*Primary Examiner* — Abdelali Serrou
(74) *Attorney, Agent, or Firm* — Leydig, Voit & Mayer, Ltd.

(57) ABSTRACT

A method, an apparatus, and a system for speech recognition are provided. A third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

29 Claims, 8 Drawing Sheets

Related U.S. Application Data continuation of application No. PCT/CN2013/090033, filed on Dec. 20, 2013.

(51) Int. Cl.
    *G10L 15/18*     (2013.01)
    *G06F 40/30*     (2020.01)
    *H04M 1/725*     (2021.01)

(52) U.S. Cl.
    CPC ... *G10L 2015/223* (2013.01); *H04M 1/72522* (2013.01); *H04M 2250/74* (2013.01)

(56) References Cited

U.S. PATENT DOCUMENTS

| | | |
|---|---|---|
| 6,839,669 B1 | 1/2005 | Gould |
| 7,203,645 B2 * | 4/2007 | Pokhariyal .............. G10L 15/26 704/251 |
| 7,447,635 B1 | 11/2008 | Konopka |
| 7,519,534 B2 * | 4/2009 | Maddux ................ G06Q 30/02 704/255 |
| 7,899,673 B2 * | 3/2011 | Brown .......................... 704/270 |
| 7,908,565 B2 | 3/2011 | Katsuranis |
| 8,140,327 B2 | 3/2012 | Kennewick |
| 8,239,206 B1 | 8/2012 | Lebeau |
| 8,706,501 B2 * | 4/2014 | Mandalia ................ G10L 15/30 704/270.1 |
| 8,811,965 B2 | 8/2014 | Cohan |
| 8,924,219 B1 * | 12/2014 | Bringert ................ G10L 15/183 704/275 |
| 9,741,343 B1 | 8/2017 | Miles |
| 2001/0041980 A1 | 11/2001 | Howard et al. |
| 2003/0088421 A1 | 5/2003 | Maes et al. |
| 2005/0131701 A1 * | 6/2005 | Cross ....................... G06F 3/167 704/270.1 |
| 2006/0206336 A1 | 9/2006 | Gurram et al. |
| 2006/0253287 A1 | 11/2006 | Kammerer et al. |
| 2007/0047719 A1 * | 3/2007 | Dhawan ................ G06F 3/167 379/235 |
| 2008/0147407 A1 * | 6/2008 | Da Palma ............... G10L 15/22 704/260 |
| 2009/0327979 A1 * | 12/2009 | Haverinen ................... 715/864 |
| 2010/0158208 A1 * | 6/2010 | Dhawan ............. H04M 1/2478 379/88.02 |
| 2010/0175020 A1 | 7/2010 | Kim et al. |
| 2010/0191529 A1 | 7/2010 | Falcon et al. |
| 2011/0035220 A1 | 2/2011 | Opaluch |
| 2012/0019610 A1 | 1/2012 | Hornyak et al. |
| 2012/0059655 A1 * | 3/2012 | Cartales ................ G10L 15/30 704/251 |
| 2012/0150546 A1 | 6/2012 | Cheng et al. |
| 2012/0209946 A1 | 8/2012 | McClure et al. |
| 2014/0040746 A1 * | 2/2014 | Reich ..................... G10L 15/22 715/728 |
| 2014/0095173 A1 | 4/2014 | Lynch et al. |
| 2014/0108010 A1 * | 4/2014 | Maltseff ................. G06F 3/167 704/235 |

FOREIGN PATENT DOCUMENTS

| | | |
|---|---|---|
| CN | 101276586 A | 10/2008 |
| CN | 101795318 A | 8/2010 |
| CN | 102394976 A | 3/2012 |
| CN | 102520788 A | 6/2012 |
| CN | 102541574 A | 7/2012 |
| CN | 202533866 U | 11/2012 |
| CN | 102830915 A | 12/2012 |
| CN | 102868827 A | 1/2013 |
| CN | 103024169 A | 4/2013 |
| JP | 2003091298 A | 3/2003 |
| KR | 20120063372 A | 6/2012 |
| KR | 20120090151 A | 8/2012 |

* cited by examiner

METHOD, INTERACTION DEVICE, SERVER, AND SYSTEM FOR SPEECH RECOGNITION

CROSS-REFERENCE TO RELATED APPLICATIONS

This application is a continuation of U.S. patent application Ser. No. 14/792,502, filed on Jul. 6, 2015, which is a continuation of International Application No. PCT/CN2013/090033, filed on Dec. 20, 2013, which claims priority to Chinese Patent Application No. 201310003504.4, filed on Jan. 6, 2013. All of the afore-mentioned patent applications are hereby incorporated by reference in their entireties.

TECHNICAL FIELD

Embodiments of the present invention relate to the field of interaction device applications, and in particular, to a method, an interaction device, a server, and a system for speech recognition.

BACKGROUND

In the prior art, a user can flexibly and independently download various applications for an interaction device (User Equipment, UE for short). However, not all these applications are provided by terminal manufacturers. An application that does not come with an interaction device but is acquired by a user is referred to as a third-party application, for example, applications in the App store of Apple and the Android market. A third-party application may also be a program that is not authorized to start by means of speech before delivery of a device. A third-party application is a program set or an instruction set that is independent of an operating system but can be invoked and executed in an operating environment of an operating system. With a large number of third-party applications, applications available for users to select are enriched significantly. Currently, two most common operating systems of interaction devices are the Android operating system and the Apple operating system (iOS for short), both of which can support third-party applications. On the Android platform, a third party can upload a developed application to the Android market for sale; on the iOS platform, a third party can upload a developed application to the App store for sale.

A user of an interaction device can download applications in the Android market or the App store to the interaction device by connecting to a network, where these applications may be free of charge or chargeable, and these applications include the most common software, for example, map, social messaging software QQ, instant messaging software Skype, or shopping software Taobao. The foregoing applications are presented on a terminal as icons. When the user needs to start a third-party application, the user taps a corresponding icon on the touchscreen to trigger starting of the third-party application.

For the interaction device, how to start a third-party application more intelligently by means of speech recognition without tapping a corresponding icon but is a difficult problem.

SUMMARY

In view of this, embodiments of the present invention provide a method, an interaction device, a server, and a system for speech recognition, so as to solve a problem of starting, by means of speech recognition, a third-party application.

According to a first aspect, a speech recognition method is provided, including: parsing one or more first texts to obtain first target semantics, where the first text is obtained through conversion from a first speech signal; determining, according to the acquired first target semantics, a third-party application object corresponding to the first target semantics, where a third-party application that is associated with the third-party application object is a program that is not authorized to start by means of speech before delivery of a device; and acquiring, from a third-party application registry, a third-party application that is associated with the determined third-party application object and starting the third-party application.

In a first possible implementation manner, before the parsing the first text to obtain first target semantics, the method further includes: acquiring first speech signals and converting the first speech signals to obtain the one or more first texts.

With reference to the first aspect or the first possible implementation manner, in a second possible implementation manner, the method further includes: converting the first speech signals to obtain at least two first texts; and scoring semantics of each first text of the at least two first texts according to a predetermined scoring rule and according to naturalness and coherence of the semantics of the at least two first texts, where a higher score represents better naturalness and coherence of the semantics.

With reference to the second possible implementation manner of the first aspect, in a third possible implementation manner, the method further includes: acquiring, from the semantics of the at least two first texts, semantics, with a highest score, the first text and exceeds a preset threshold as the first target semantics.

With reference to the third possible implementation manner of the first aspect, in a fourth possible implementation manner, the method further includes: determining, according to the first target semantics, all third-party application objects corresponding to the first target semantics; if the number of the third-party application objects is greater than or equal to two, acquiring information about all the third-party application objects that are associated with the first target semantics; sending prompt information, where the prompt information includes the information about the third-party application objects and is used to prompt a user to further send, according to the information about the third-party application objects, a selection instruction, so as to select a target third-party application object from all the third-party application objects that are associated with the first target semantics; and receiving the selection instruction, and selecting a corresponding target third-party application object according to the selection instruction; and correspondingly, the acquiring, from a third-party application registry, a third-party application that is associated with the determined third-party application object and starting the third-party application specifically includes: acquiring, from the third-party application registry, a third-party application that is associated with the target third-party application object and starting the third-party application.

With reference to the fourth possible implementation manner of the first aspect, in a fifth possible implementation manner, when the selection instruction is a second speech signal, correspondingly, the selecting a corresponding target third-party application object according to the received selection instruction specifically includes: converting the second speech signal to obtain a second text; parsing the second text to acquire second target semantics; and determining a corresponding target third-party application object according to the second target semantics.

With reference to the first aspect or the foregoing possible implementation manners of the first aspect, in a sixth possible implementation manner, the method further includes: before the acquiring, from a third-party application registry, a third-party application that is associated with the determined third-party application object and starting the third-party application, generating the third-party application registry.

With reference to the first aspect or the foregoing possible implementation manners of the first aspect, in a seventh possible implementation manner, after the starting the third-party application, the method further includes: sending a semantics command of the first target semantics to the third-party application, so that the third-party application invokes, according to the semantics command of the first target semantics, a third-party application interface (API) that matches the started third-party application.

With reference to the first aspect or the foregoing possible implementation manners of the first aspect, in an eighth possible implementation manner, the method further includes: receiving, by the third-party application, a third speech signal of the user; converting the third speech signal to obtain a third text; and invoking, according to a semantics command of the third text, a third-party application interface (API) that matches the started third-party application, so that the started third-party application acquires a required hardware or software resource by using the API.

With reference to the first aspect or the foregoing possible implementation manners of the first aspect, in a ninth possible implementation manner, the method is executed by an interaction device.

With reference to the first aspect or the foregoing possible implementation manners of the first aspect, in a ninth possible implementation manner, the parsing one or more first texts to obtain first target semantics is executed by a server; and the determining, according to the acquired first target semantics, a third-party application object corresponding to the first target semantics and the acquiring, from a third-party application registry, a third-party application that is associated with the determined third-party application object and starting the third-party application are executed by an interaction device.

According to a second aspect, an interaction device for speech recognition is provided, including a parsing unit, a determining unit, a starting unit, and a storage unit, where: the parsing unit is configured to parse one or more first texts sent by a speech recognizing unit to obtain first target semantics, where the first text is obtained through conversion from a first speech signal; the determining unit is configured to determine, according to the first target semantics acquired by the parsing unit, a third-party application object corresponding to the first target semantics, where a third-party application that is associated with the third-party application object is a program that is not authorized to start by means of speech before delivery of a device; the starting unit is configured to access the storage unit, acquire, from a third-party application registry stored by the storage unit, a third-party application that is associated with the third-party application object determined by the determining unit, and start the third-party application; and the storage unit is configured to store the third-party application registry and the third-party application.

In a first possible implementation manner, the interaction device further includes the speech recognizing unit, configured to convert the first speech signals to obtain the one or more first texts and send the one or more first texts to the parsing unit.

With reference to the second aspect or the first possible implementation manner of the second aspect, in a second possible implementation manner, the interaction device further includes a speech recognizing unit, where: the speech recognizing unit is configured to convert the first speech signals to obtain at least two first texts and sends the at least two first texts to the parsing unit; and the parsing unit is specifically configured to score semantics of each first text of the at least two first texts according to a predetermined scoring rule and according to naturalness and coherence of the semantics of the at least two first texts, where a higher score represents better naturalness and coherence of the semantics, and acquire, from the semantics of the at least two first texts, semantics with a highest score and of the first text as the first target semantics.

With reference to the second possible implementation manner of the second aspect, in a third possible implementation manner, the parsing unit is specifically configured to acquire, from the semantics of the at least two first texts, semantics, with a highest score, of the first text and exceeds a preset threshold as the first target semantics.

With reference to the second aspect or the foregoing possible implementation manners of the second aspect, in a fourth possible implementation manner, the interaction device further includes a sending unit and a receiving unit, where: the determining unit is specifically configured to determine, according to the first target semantics, all third-party application objects corresponding to the first target semantics, and if the number of the third-party application objects is greater than or equal to two, acquire information about all the third-party application objects that are associated with the first target semantics; the sending unit is configured to send prompt information, where the prompt information includes the information about the third-party application objects and is used to prompt a user to further send, according to the information about the third-party application objects, a selection instruction, so that the determining unit selects a target third-party application object from all the third-party application objects that are associated with the first target semantics; the receiving unit is configured to receive the selection instruction sent by the user; the determining unit is specifically configured to select a corresponding target third-party application object according to the received selection instruction; and the starting unit acquires, from the third-party application registry stored by the storage unit, a third-party application that is associated with the target third-party application object and starts the third-party application.

With reference to the fourth possible implementation manner of the second aspect, in a fifth possible implementation manner, the speech recognizing unit is further configured to, when the selection instruction is a second speech signal, convert the second speech signal to obtain a second text and send the second text to the parsing unit; the parsing unit further is configured to parse the second text to acquire second target semantics; and the determining unit is further configured to determine a corresponding target third-party application object according to the second target semantics.

With reference to the foregoing possible implementation manners of the second aspect, in a sixth possible implementation manner, the interaction device further includes a generating unit, where before the starting unit acquires, from the third-party application registry, the third-party application that is associated with the determined third-party application object and starts the third-party application, the generating unit generates the third-party application registry and sends the third-party application registry to the storage unit.

With reference to the second aspect or the foregoing possible implementation manners of the second aspect, in a seventh possible implementation manner, after starting the third-party application, the starting unit sends a semantics command of the first target semantics to the third-party application, so that the third-party application invokes, according to the semantics command of the first target semantics, a third-party application interface (API) that matches the started third-party application.

According to a third aspect, a server for speech recognition is provided, including a parsing unit, a determining unit, a starting unit, and a storage unit, where: the parsing unit is configured to parse one or more first texts to obtain first target semantics, where the first text is obtained through conversion from a first speech signal; the determining unit is configured to determine, according to the first target semantics acquired by the parsing unit, a third-party application object corresponding to the first target semantics, where a third-party application that is associated with the third-party application object is a program that is not authorized to start by means of speech before delivery of a device; the starting unit is configured to acquire, from a third-party application registry stored by the storage unit, a third-party application that is associated with the third-party application object determined by the determining unit and start the third-party application; and the storage unit is configured to store the third-party application registry and the third-party application.

In a first possible implementation manner, the parsing unit is specifically configured to: score, according to a predetermined scoring rule and according to naturalness and coherence of semantics of at least two first texts that are obtained through conversion from the first speech signal, semantics of each first text of the at least two first texts, where a higher score represents better naturalness and coherence of the semantics; and acquire, from the semantics of the at least two first texts, semantics with a highest score and of the first text as the first target semantics.

With reference to the first possible implementation manner of the third aspect, in a second possible implementation manner, the parsing unit is specifically configured to acquire, from the semantics of the at least two first texts, semantics, with a highest score, of the first text and exceeds a preset threshold as the first target semantics.

With reference to the third aspect or the foregoing possible implementation manners of the third aspect, in a third possible implementation manner, the server further includes a sending unit and a receiving unit, where: the determining unit is specifically configured to determine, according to the first target semantics, all third-party application objects corresponding to the first target semantics, and if the number of the third-party application objects is greater than or equal to two, acquire information about all the third-party application objects that are associated with the first target semantics; the sending unit is configured to send prompt information, where the prompt information includes the information about the third-party application objects and is used to prompt a user to further send, according to the information about the third-party application objects, a selection instruction, so that the determining unit selects a target third-party application object from all the third-party application objects that are associated with the first target semantics; the receiving unit is configured to receive the selection instruction sent by the user; the determining unit is specifically configured to select a corresponding target third-party application object according to the received selection instruction; and the starting unit acquires, from the third-party application registry stored by the storage unit, a third-party application that is associated with the target third-party application object and starts the third-party application.

With reference to the third possible implementation manner of the third aspect, in a fourth possible implementation manner, the parsing unit is further configured to, when the selection instruction is a second speech signal, parse a second text to acquire second target semantics, where the second text is obtained through conversion from the second speech signals; and the determining unit is specifically configured to determine a corresponding target third-party object according to the second target semantics.

With reference to the third aspect or the foregoing possible implementation manners of the third aspect, in a fifth possible implementation manner, the server further includes a generating unit, where before the starting unit acquires, from the third-party application registry, the third-party application that is associated with the determined third-party application object and starts the third-party application, the generating unit generates the third-party application registry and sends the third-party application registry to the storage unit.

With reference to the third aspect or any one of the foregoing possible implementation manners of the third aspect, in a sixth possible implementation manner, after starting the third-party application, the starting unit sends a semantics command of the first target semantics to the third-party application, so that the third-party application invokes, according to the semantics command of the first target semantics, a third-party application interface (API) that matches the started third-party application.

With reference to the third aspect or the foregoing possible implementation manners of the third aspect, in a seventh possible implementation manner, after the starting unit starts the third-party application, so that the third-party application converts third speech signal to obtain a third text and invokes, according to a semantics command of the third text, a third-party application interface (API) that matches the started third-party application, so that the started third-party application acquires a required hardware or software resource by using the API.

With reference to the third aspect or the foregoing possible implementation manners of the third aspect, in an eighth possible implementation manner, the receiving unit is further configured to, before the first text is parsed to obtain the first target semantics, receive the first text sent by an interaction device.

With reference to the third aspect or the foregoing possible implementation manners of the third aspect, in a ninth possible implementation manner, the sending unit is further configured to send a response feedback to the interaction device after the third-party application is started.

According to a fourth aspect, an apparatus for speech recognition is provided, including a processor and a memory, where: the processor parses one or more first texts to obtain first target semantics, where the first text is obtained through conversion from a first speech signal; determines, according to the acquired first target semantics, a third-party application object corresponding to the first target semantics, where a third-party application that is associated with the third-party application object is a program that is not authorized to start by means of speech before delivery of a device; and accesses the memory, acquires, from a third-party application registry stored by the memory, a third-party application that is associated with the determined third-party application object, and starts the third-party application; the memory stores the third-party application registry and the third-party application; and the processor executes an instruction of the foregoing method.

In a first possible implementation manner, before parsing the first text to obtain the first target semantics, the processor acquires the first speech signals and converts the first speech signals to obtain the one or more first texts.

With reference to the fourth aspect or the first possible implementation manner, in a second possible implementation manner, the processor converts the first speech signals to obtain at least two first texts and scores semantics of each first text of the at least two first texts according to a predetermined scoring rule and according to naturalness and coherence of the semantics of the at least two first texts, where a higher score represents better naturalness and coherence of the semantics.

With reference to the second possible implementation manner of the fourth aspect, in a third possible implementation manner, the processor acquires, from the semantics of the at least two first texts, semantics, with a highest score, of the first text and exceeds a preset threshold as the first target semantics.

With reference to the third possible implementation manner of the fourth aspect, in a fourth possible implementation manner, the processor determines, according to the first target semantics, all third-party application objects corresponding to the first target semantics; if the number of the third-party application objects is greater than or equal to two, acquires all information about the third-party application objects that are associated with the first target semantics; sends prompt information, where the prompt information includes the information about the third-party application objects and is used to prompt a user to further send, according to the information about the third-party application objects, a selection instruction, so as to select a target third-party application object from all the third-party application objects that are associated with the first target semantics; and receives the selection instruction, and selects a corresponding target third-party application object according to the selection instruction; correspondingly, the acquiring, from a third-party application registry, a third-party application that is associated with the determined third-party application object and starting the third-party application specifically includes: acquiring, from the third-party application registry, a third-party application that is associated with the target third-party application object and starting the third-party application.

With reference to the fourth possible implementation manner of the fourth aspect, in a fifth possible implementation manner, when the selection instruction is a second speech signal, correspondingly, that the processor selects the corresponding target third-party application object according to the received selection instruction specifically includes: converting the second speech signal to obtain a second text; parsing the second text to acquire second target semantics; and determining a corresponding target third-party application object according to the second target semantics.

With reference to the fourth aspect or the foregoing possible implementation manners of the fourth aspect, in a sixth possible implementation manner, before acquiring, from the third-party application registry, the third-party application that is associated with the determined third-party application object and starting the third-party application, the processor generates the third-party application registry and sends the third-party application registry to the memory.

With reference to the fourth aspect or the foregoing possible implementation manners of the fourth aspect, in a seventh possible implementation manner, after starting the third-party application, the processor further includes: sending a semantics command of the first target semantics to the third-party application, so that the third-party application invokes, according to the semantics command of the first target semantics, a third-party application interface (API) that matches the started third-party application.

With reference to the fourth aspect or the foregoing possible implementation manners of the fourth aspect, in an eighth possible implementation manner, after the processor starts the third-party application, so that the third-party application receives a third speech signal of the user, converts the third speech signal to obtain a third text, and invokes, according to a semantics command of the third text, a third-party application interface (API) that matches the started third-party application, so that the started third-party application acquires a required hardware or software resource by using the API.

According to a fifth aspect, a system for speech recognition is provided, providing any one of the foregoing interaction device, server, or apparatus.

According to the foregoing technical solutions, a third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Speech recognition technologies are technologies that enable a machine, that is, an apparatus, to convert a speech signal into a corresponding text or command by using recognition and understanding processes. The speech recognition technologies mainly include three aspects: feature extraction technologies, pattern matching criteria, and model training technologies.

In the prior art, the speech recognition technologies generally output a recognition result in a form of text or command. In an entire speech recognition process, a speech signal is input and processed, and then text content is output or a command is output to drive another device, which changes a conventional manner of mouse or keyboard input.

In the prior art, an interaction device may include, for example, a smart phone, a tablet computer (Tablet PC), and a game console. The foregoing interaction device generally has a speech recognition function, and accuracy of conversion from speech to a text by the speech recognition function is continuously improved. However, when a third-party application is started on the interaction device, the application can be invoked only by means of tapping or mouse clicking. Therefore, a user hopes to improve an intelligence level of the interaction device, for example, the third-party application can be directly started by speech recognition. An embodiment of the present invention provides such a method, which can implement an issue that a third-party application is directly started according to a speech signal of a user.

Figure 1:
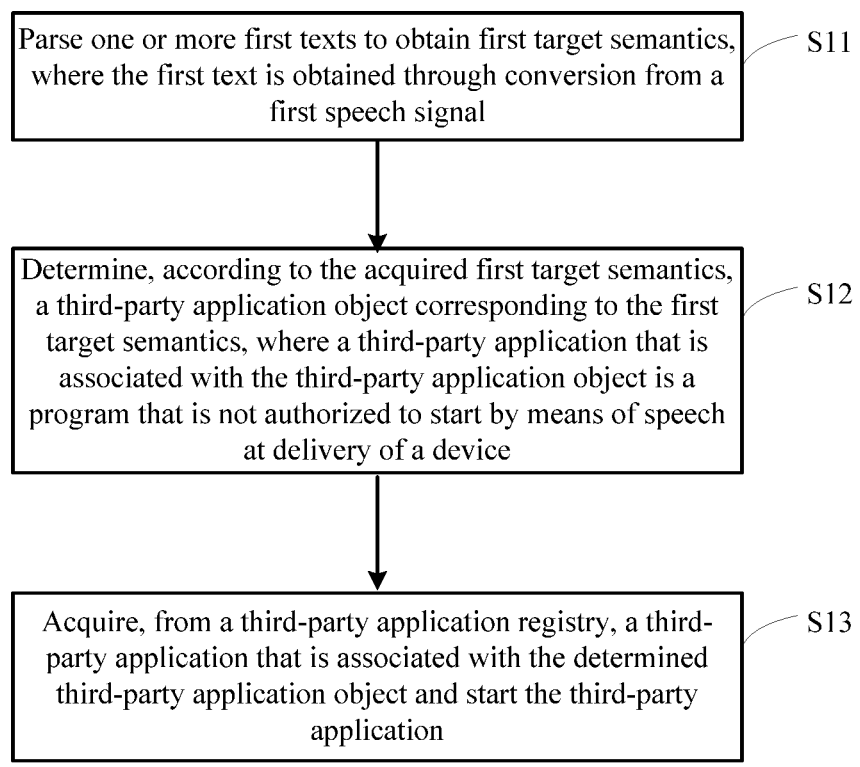
FIG. 1 is a schematic flowchart of a speech recognition method according to a first embodiment of the present invention.

FIG. 1 is a schematic flowchart of a speech recognition method according to a first embodiment of the present invention, which includes the following content.

S11. Parse one or more first texts to obtain first target semantics, where the first text is obtained through conversion from a first speech signal.

S12. Determine, according to the acquired first target semantics, a third-party application object corresponding to the first target semantics, where a third-party application that is associated with the third-party application object is a program that is not authorized to start by means of speech before delivery of a device.

S11 and S12 are also referred to as semantic analysis in a context.

S13. Acquire, from a third-party application registry, a third-party application that is associated with the determined third-party application object and start the third-party application.

In a different embodiment, a third-party application may be downloaded onto an interaction device of a user, or may be downloaded onto a server; a speech recognition function that converts a speech signal into a text may be built in the interaction device, or may be placed on the server; and parsing a text to obtain target semantics, determining a third-party application object corresponding to the target semantics, and starting a third-party application may be executed by the interaction device, or may be executed by the server. The server is used to provide support service for the interaction device, which is different from a third-party server that provides support for a third-party application in the following.

According to this embodiment of the present invention, with a speech recognition function, a third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

Optionally, in a different embodiment, before the parsing the first text to obtain first target semantics, the method further includes: acquiring first speech signals and converting the first speech signals to obtain the one or more first texts.

Optionally, in a different embodiment, the method further includes: converting the first speech signals to obtain at least two first texts; and correspondingly, scoring semantics of each first text of the at least two first texts according to a predetermined scoring rule and according to naturalness and coherence of the semantics of the at least two first texts, where a higher score represents better naturalness and coherence of the semantics; and acquiring, from the semantics of the at least two first texts, semantics with a highest score and of the first text as the first target semantics.

Optionally, in a different embodiment, the acquiring, from the semantics of the at least two first texts, semantics with a highest score and of the first text as the first target semantics includes: acquiring, from the semantics of the at least two first texts, semantics, with a highest score, of the first text and exceeds a preset threshold as the first target semantics.

Optionally, in a different embodiment, the determining, according to the acquired first target semantics, a third-party application object corresponding to the first target semantics specifically includes: determining, according to the first target semantics, all third-party application objects corresponding to the first target semantics; if the number of the third-party application objects is greater than or equal to two, acquiring information about all the third-party application objects that are associated with the first target semantics; sending prompt information, where the prompt information includes the information about the third-party application objects and is used to prompt a user to further send, according to the information about the third-party application objects, a selection instruction, so as to select a target third-party application object from all the third-party application objects that are associated with the first target semantics; and receiving the selection instruction, and selecting a corresponding target third-party application object according to the received selection instruction; and correspondingly, the acquiring, from a third-party application registry, a third-party application that is associated with the determined third-party application object and starting the third-party application specifically includes: acquiring, from the third-party application registry, a third-party application that is associated with the target third-party application object and starting the third-party application.

Optionally, in a different embodiment, the selection instruction is a second speech signal; and correspondingly, the selecting a corresponding target third-party application object according to the received selection instruction specifically includes: converting the second speech signal to obtain a second text; parsing the second text to acquire second target semantics; and determining a corresponding target third-party application object according to the second target semantics.

Optionally, in a different embodiment, before the acquiring, from a third-party application registry, a third-party application that is associated with the determined third-party application object and starting the third-party application, the method further includes: generating the third-party application registry.

Optionally, in a different embodiment, after the starting the third-party application, the method further includes: sending a semantics command of the first target semantics to the third-party application, so that the third-party application invokes, according to the semantics command of the first target semantics, a third-party application interface API that matches the started third-party application.

Optionally, in a different embodiment, after the starting the third-party application, the method further includes: converting, by the third-party application, the third speech signal to obtain a third text; and invoking, according to a semantics command of the third text, a third-party application interface API that matches the started third-party application, so that the started third-party application acquires a required hardware or software resource by using the API.

Optionally, in a different embodiment, the method is executed by an interaction device.

Optionally, in a different embodiment, according to the method, the parsing one or more first texts to obtain first target semantics is executed by a server; and the determining, according to the acquired first target semantics, a third-party application object corresponding to the first target semantics and the acquiring, from a third-party application registry, a third-party application that is associated with the determined third-party application object and starting the third-party application are executed by an interaction device.

Figure 2:
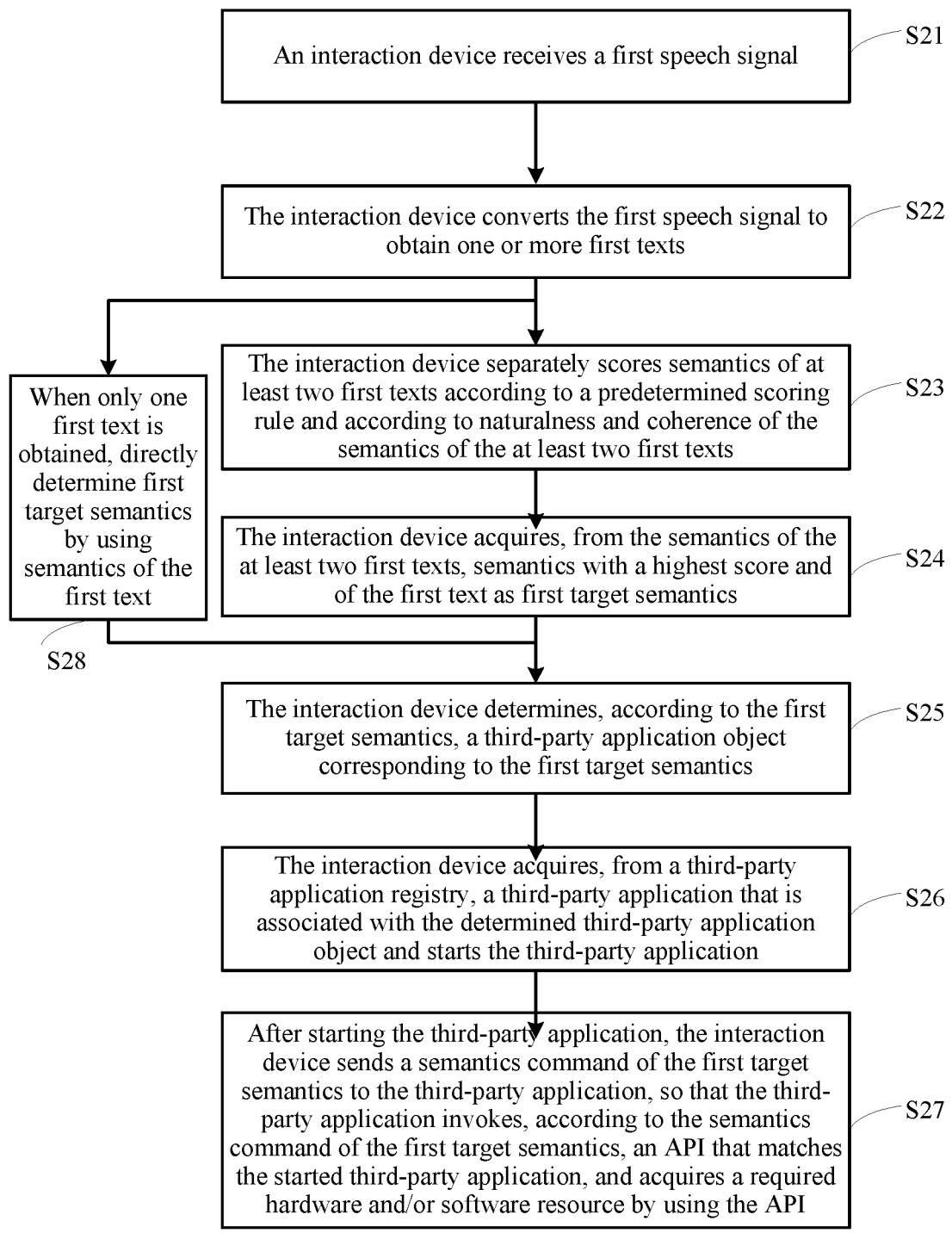
FIG. 2 is a schematic flowchart of a speech recognition method according to a second embodiment of the present invention.

FIG. 2 is a schematic flowchart of a speech recognition method according to a second embodiment of the present invention. In the second embodiment, an interaction device executes this method, and a user downloads a third-party application to the interaction device. The interaction device includes at least a speech recognizing unit, a parsing unit, a determining unit, a starting unit, a storage unit, and the like.

S21. The interaction device receives a first speech signal.

Here, the first speech signal is words of a user, for example, "Is old Hu online". The interaction device may receive the first speech signal by using a microphone.

S22. The interaction device converts the first speech signal to obtain one or more first texts.

After receiving the first signal, a speech recognizing unit of the interaction device converts speech waveforms into a text (Speech to text), where the text is corresponding to the foregoing first text. A first text output by the speech recognizing unit after conversion may be "Is old Hu online", "Is old Hu first", and/or "Is Tiger online" and is sent to a determining unit for processing. In this embodiment of the present invention, the interaction device includes the speech recognizing unit, the parsing unit, the determining unit, and the starting unit, which separately execute a specific step in the second embodiment of the present invention. In another embodiment, the speech recognizing unit and the parsing unit, the determining unit, and the starting unit may be included in different devices.

S23. The interaction device separately scores semantics of at least two first texts according to a predetermined scoring rule and according to naturalness and coherence of the semantics of the at least two first texts.

The parsing unit of the interaction device lists corresponding optional semantics according to the first text, for example, "old Hu" exists in an address book of the interaction device, and a word, such as "online", whose occurrence probability is high, exists in previous speech input of the user. The parsing unit sorts multiple combinations, for example, "Is old Hu online", "Is old Hu first", and "Is Tiger online", and scores each combination according to naturalness and coherence of the semantics, where a higher score represents better naturalness and coherence of the semantics.

Optionally, in a different embodiment, the parsing unit may set a scoring threshold, and score various combinations of the semantics of the first text according to the predetermined scoring rule. The parsing unit performs a task analysis and accesses a storage unit only when a score of semantics of the first text is the highest and exceeds a predetermined threshold.

S28. When the interaction device converts the first speech signal and obtains only one first text, it directly determines first target semantics by using the semantics of the first text. The scoring processes S23 and S24 can be skipped; instead, the step S25 and subsequent steps are executed.

S24. The interaction device acquires, from the semantics of the at least two first texts, semantics with a highest score and of a first text as first target semantics.

Optionally, in an embodiment, if the parsing unit of the interaction device acquires only one piece of semantics with the highest score, for example, "Old Hu is online", of a first text, S25 is executed next.

In another embodiment, when no first text has a semantics score exceeding the predetermined threshold, or when two or more first texts have a semantics score exceeding the predetermined threshold, the parsing unit may feed back, to the speech recognizing unit according to a context, a command indicating that more information needs to be input. Optionally, the parsing unit analyzes, according to a context of the semantics, that "online" is closely related to text communication and speech communication, that is, feeds back a command to the speech recognizing unit, for example, "Do you hope to have online speech communication or online text communication". The speech recognizing unit may feed back the command to the user by means of speech or text, so that the user inputs more requirements. For example, the user answers "speech", and therefore a "speech" requirement is added; and the parsing unit uses "speech" and "online" as the first target semantics.

S25. The interaction device determines, according to the first target semantics, a third-party application object corresponding to the first target semantics.

The determining unit of the interaction device determines a related task according to the selected first target semantics, for example, a task corresponding to "online" is a social task; and the starting unit needs to start a corresponding third-party application, such as QQ and/or Skype. For ease of description, in this specification, a candidate third-party application is referred to as a third-party application object. The determining unit may select at its own, based on an association relationship between predefined semantics and a third-party application or according to use frequency of a third-party application, to determine a third-party application object by using the first target semantics, which is not limited in the present invention.

In an embodiment, only one third-party application object corresponding to the first target semantics is determined according to the first target semantics, for example, instant messaging software Skype.

In another embodiment, the interaction device may further include a sending unit and a receiving unit. If the number of determined third-party application objects is greater than or equal to two, the interaction device acquires information about all third-party application objects that are associated with the first target semantics; the sending unit sends prompt information, where the prompt information includes the information about the third-party application objects and is used to prompt the user to further send, according to the information about the third-party application objects, a selection instruction, so that the determining unit selects a target third-party application object from all the third-party application objects that are associated with the first target semantics; and the receiving unit receives the selection instruction, and the determining unit selects a corresponding target third-party application object specifically according to the received selection instruction; correspondingly, the starting unit acquires a third-party application that is associated with the target third-party application object and starts the third-party application.

If at least two third-party application objects are found according to the first target semantics, for example, the instant messaging software Skype and social messaging software QQ, the determining unit may feed back, to the speech recognizing unit according to a context, a command indicating that more information needs to be input, for example, feed back a command to the speech recognizing unit, for example, "Do you hope to have instant communication by Skype or social communication by QQ". The speech recognizing unit may feed back the command to the user by means of speech or text, so that the user inputs more requirements. If the user answers "Skype", and therefore the parsing unit uses "Skype" as second target semantics. Next, the determining unit determines, according to the second target semantics, that a target third-party application object is the instant messaging software Skype.

S26. The interaction device acquires, from a third-party application registry, a third-party application that is associated with the determined third-party application object and starts the third-party application.

The starting unit of the interaction device searches a third-party application registration information table for the determined third-party application and starts the third-party application.

After determining a specific third-party application, the starting unit accesses the storage unit. The storage unit stores a third-party application registration information table that is generated when the interaction device is powered on or a third-party application registration information table that is generated when a program is installed. The starting unit finds a corresponding program, for example, Skype, and starts the program. Different from a default application registry that is provided with the interaction device before delivery, the third-party application registration information table may be generated when a third-party application is installed, and may also be generated when the interaction device is powered on after the third-party application is installed, as long as the third-party application registration information table is generated before a third-party application that is associated with the determined third-party application object is acquired from the third-party application registry and the third-party application is started. In this embodiment, the third-party application registration information table is stored in the interaction device. In another embodiment, the third-party application registration information table may also be stored in another device except the interaction device, or be stored in both the interaction device and another device.

S27. After starting the third-party application, the interaction device sends a semantics command of the first target semantics to the third-party application, so that the third-party application invokes, according to the semantics command of the first target semantics, an API (Application Programming Interface) that matches the started third-party application, and acquires a required hardware and/or software resource by using the API.

Figure 3:
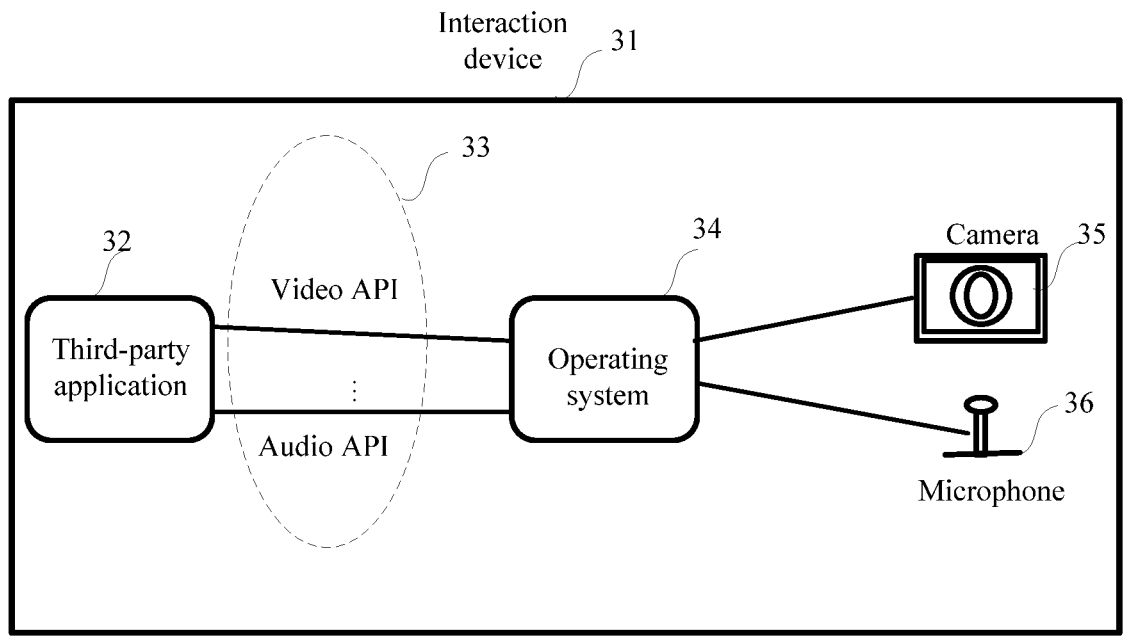
FIG. 3 is a schematic diagram of invoking, after a third-party application is started, an interaction device according to an embodiment of the present invention.

FIG. 3 is a schematic diagram of invoking, after a third-party application is started, an interaction device according to an embodiment of the present invention. After starting a third-party application 32, an interaction device 31 communicates with the third-party application 32 by using a defined API 33. If a third-party application needs to enable video and voice chat functions, it invokes a camera (camera) 35 and a microphone (microphone) 36 of the interaction device by using a video API and an audio API interface that are predefined in an operating system 34 of the interaction device. In an existing operating system of an interaction device, thousands of APIs are defined to support various third-party applications, so as to implement different functions. By using these APIs, third-party applications are capable of communicating with a platform of the interaction device and invoking various resources of the interaction device.

For example, after a third-party application is started, the third-party application receives a semantics command of a parsing unit, and completes a corresponding operation according to the semantics command. For example, after the third-party application QQ is started, the parsing unit sends a semantics command to QQ, where the command may also be transferred by a predefined API; after receiving the command, QQ searches a buddy list of QQ for a status of a communication object, that is, a friend whose name is "Old Hu", and feeds back the status information to the parsing unit; and the parsing unit translates the status information into corresponding semantics, and outputs the semantics to the user by using a speech recognizing unit, for example, finally outputs, for example, "Old Hu is not online" in a form of speech information to notify the user. In this process, the third-party application may require user authentication, and a user account and a password are required to be input, where this type of information is fed back by the third-party application to the user by using the parsing unit and the speech recognizing unit; and the user inputs a corresponding account and password by means of speech or keyboard.

In the second embodiment of the present invention, the user only needs to send a command by speech, and the interaction device can recognize the speech, further perform semantic analysis, and finally start a third-party application; in addition, the interaction device may further feed back status information related to the third-party application to the user after starting the third-party application. This provides a new method for starting a third-party application and significantly facilitates use of the user.

Text information interacted between the foregoing units such as the speech recognizing unit and the parsing unit may be decoded code and may be presented to the user in a form of speech or onscreen text.

According to this embodiment of the present invention, with a speech recognition function, a third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

Figure 4:
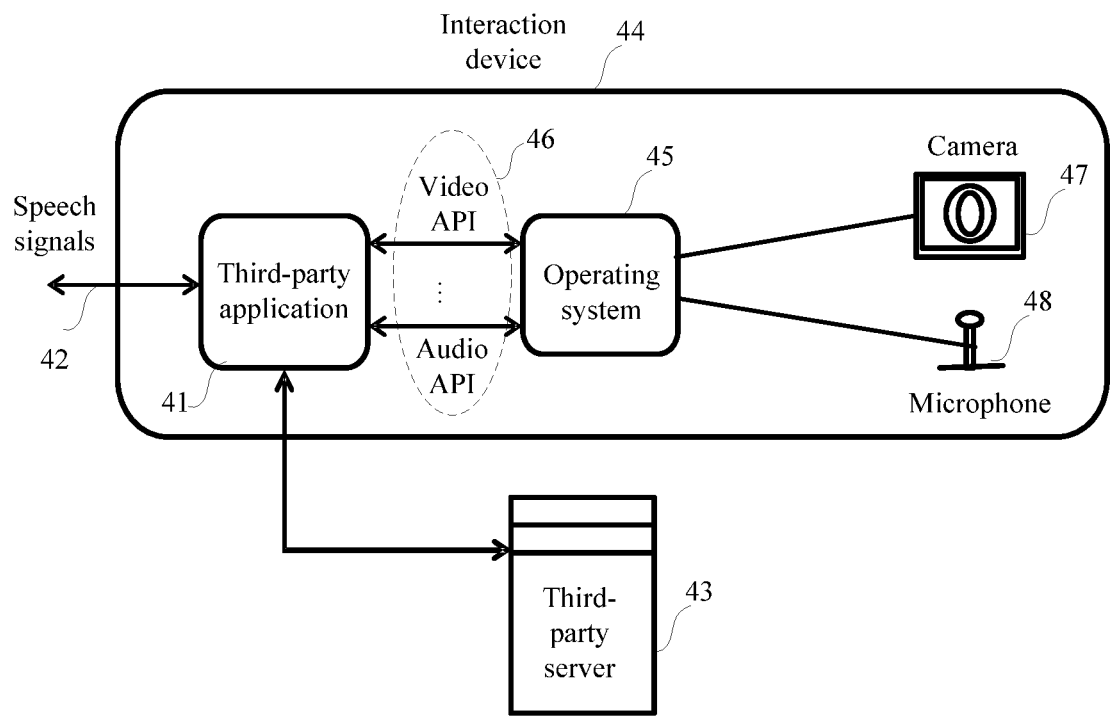
FIG. 4 is a schematic diagram of a third-party application supporting a speech recognition function according to a third embodiment of the present invention.

FIG. 4 is a schematic architecture diagram of a third-party application supporting a speech recognition function according to a third embodiment of the present invention. In the third embodiment, an interaction device has a speech recognition function, and a user downloads a third-party application to the interaction device, where different from a third-party application in the second embodiment, the third-party application itself also supports the speech recognition function and can execute a related operation according to speech input of the user. Therefore, processes of recognizing and starting a corresponding third-party application according to a speech signal of the user in the second embodiment are the same as that in the third embodiment, and for brevity, details are not repeatedly described herein. A difference lies in a process of executing a task by the third-party application after the third-party application is started in the third embodiment.

Referring to FIG. 4, after a third-party application 41 is started, because the third-party application 41 itself has the speech recognition function, it can directly receive a speech signal 42 of the user, recognize the speech signal 42 to obtain a corresponding command, and execute a related operation. The third-party application receives the speech signal 42 of the user, converts the speech signal 42 to obtain a text, completes parsing of semantics of the text, and executes a task corresponding to the semantics. Optionally, the third-party application 41 may implement semantic analysis and task execution by using a third-party server 43 corresponding to the third-party application 41. When according to a semantics command of the text, the third-party application 41 needs to invoke a resource of an interaction device 44, the third-party application 41 contacts the interaction device by using an API 46 defined by an operating system 45 of the interaction device, and starts the related resource, for example, invokes a camera 47 and a microphone 48 to perform video communication. For example, if the third-party application started by the interaction device is QQ, and a corresponding third-party server is, for example, a server of Tencent, communication between the third-party application and the third-party server may be a private interface and a protocol that are defined by a third party. If the third-party application is a map and the third-party application needs to invoke GPS information of the interaction device, address information of the interaction device can be queried by using a corresponding API, and for specific map information, corresponding map information can be acquired by the third-party application by accessing a third-party server of the third-party application.

Figure 5:
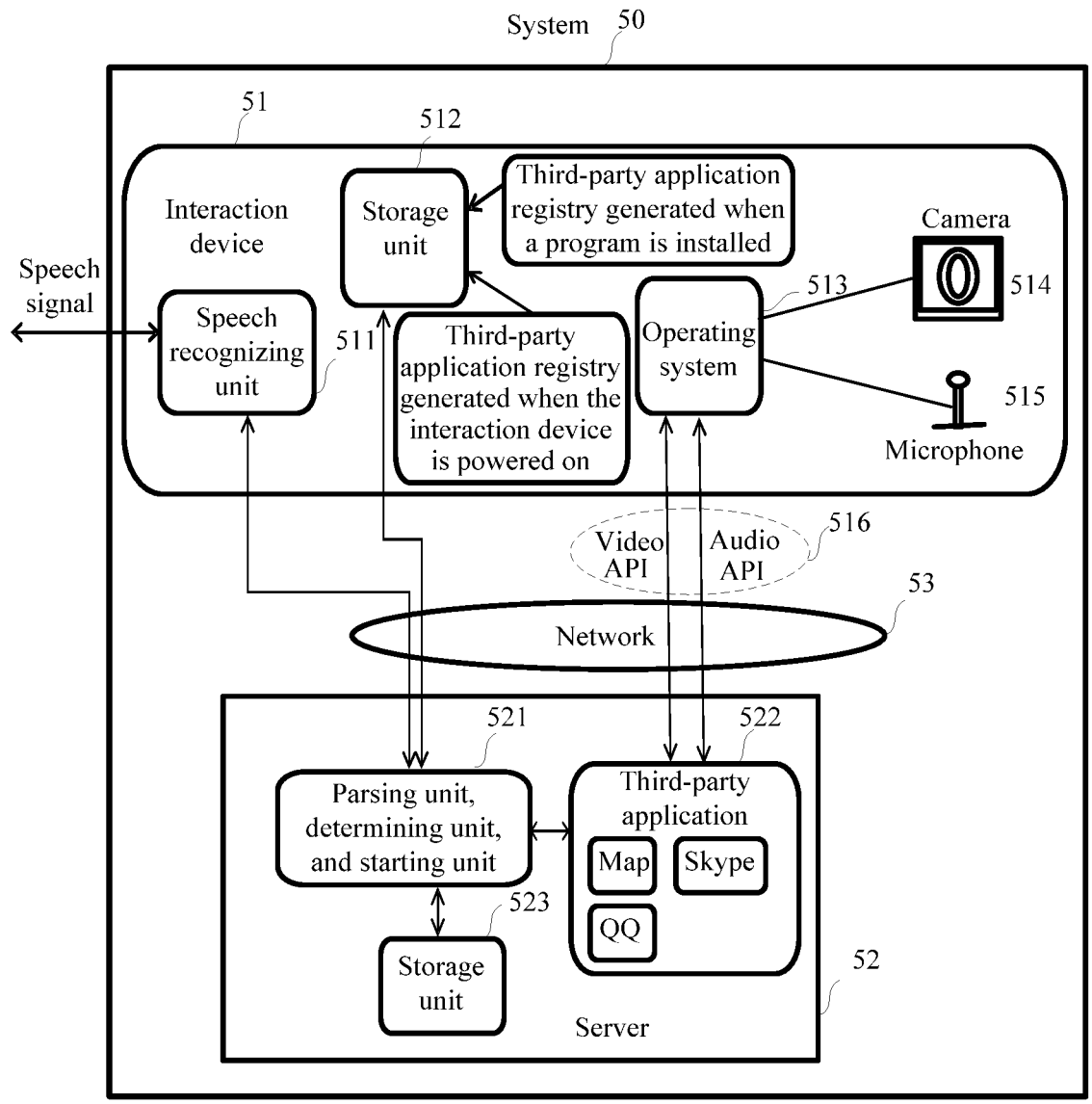
FIG. 5 is a schematic architecture diagram of a system for speech recognition according to a fourth embodiment of the present invention.

FIG. 5 is a schematic architecture diagram of a system 50 for speech recognition according to a fourth embodiment of the present invention. The system 50 includes an interaction device 51 and a server 52. The interaction device 51 may include a speech recognizing unit 511, a storage unit 512, an operating system 513, a camera 514, a microphone 515, and the like. The server 52 may include third-party applications 522, a storage unit 523, a parsing unit, a determining unit, and a starting unit, where the parsing unit, the determining unit, and the starting unit are marked as 521 in FIG. 5. The interaction device 51 is connected to the server 52 by using a network 53. The operating system 513 defines multiple APIs 516 that are used to support various third-party applications 522.

In the system for speech recognition in FIG. 5, the interaction device has only a speech recognition function. Functions of semantic analysis and starting of the third-party applications are completed by the server, and the third-party applications are stored in the server. Optionally, these third-party applications do not support the speech recognition function. The storage unit can be included in both the interaction device and the server, or be placed on either of them. When the starting unit accesses the storage unit, the starting unit may alternatively select one storage unit. The interaction device is connected to the server by using the network, where the network provides a pipe for communication between the interaction device and the server, which may be a wireless network or a wired network.

Figure 6:
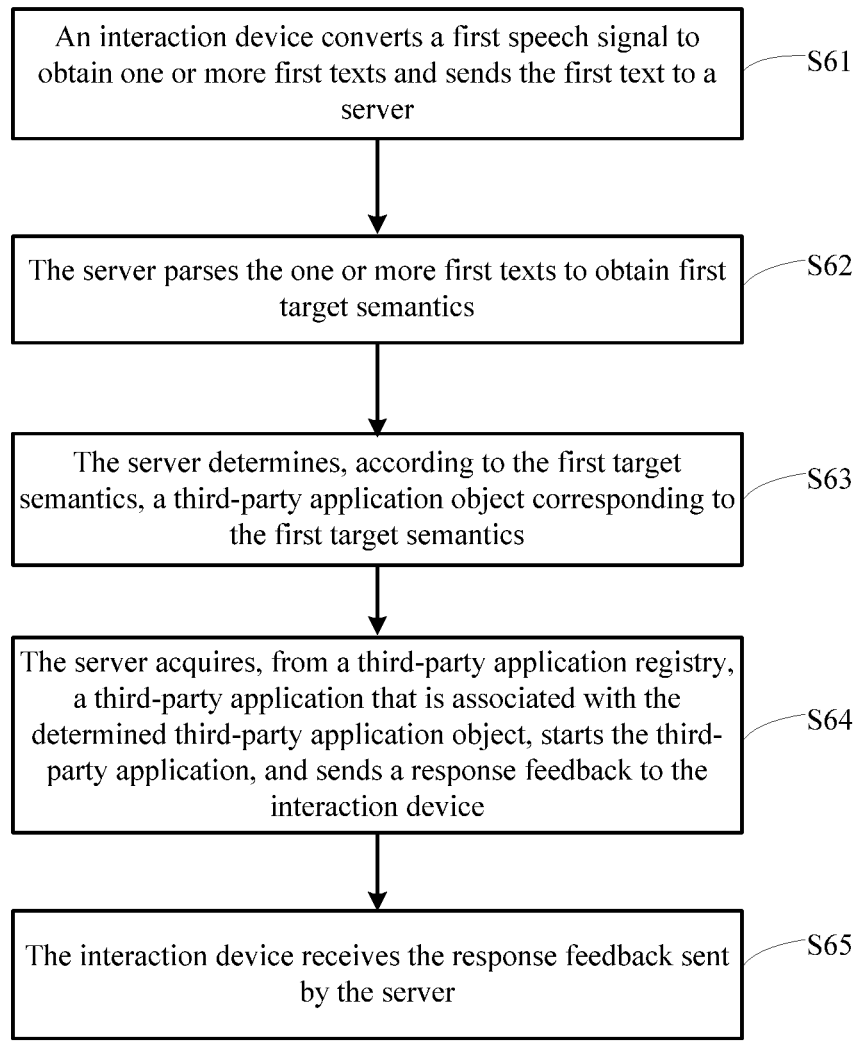
FIG. 6 is a schematic flowchart of a speech recognition method according to a fifth embodiment of the present invention.

FIG. 6 is a schematic flowchart of a speech recognition method, based on the architecture of the system 50 in FIG. 5, according to a fifth embodiment of the present invention.

S61. An interaction device converts a first speech signal to obtain one or more first texts and sends the first text to a server.

Here, the first speech signals are words of a user, for example, "Is Old Hu online". After the first speech signal is received by a microphone of the interaction device, speech waveforms are converted into a first text by a speech recognizing unit of the interaction device. For example, a first text output by the speech recognizing unit after conversion may be "Is old Hu online", "Is old Hu first", and/or "Is Tiger online" and is sent to the server for processing.

S62. The server parses the one or more first texts to obtain first target semantics. This step may include the following specific content.

In this embodiment, the server includes a parsing unit, a determining unit, and a starting unit. The parsing unit of the server receives at least two first texts that are sent by the interaction device and are obtained through conversion from the first speech signal, scores semantics of each first text of the at least two first texts according to a predetermined scoring rule and according to naturalness and coherence of the semantics of the at least two first texts, where a higher score represents better naturalness and coherence of the semantics, and acquires semantics with a highest and of the first text as the first target semantics.

Optionally, the parsing unit lists corresponding optional semantics according to the first text, for example, "old Hu" exists in an address book of the interaction device, and a word, such as "online", whose occurrence probability is high, exists in previous speech input of the user. The parsing unit sorts multiple combinations, for example, "Is old Hu online", "Is old Hu first", and "Is Tiger online", and scores each combination according to naturalness and coherence of the semantics, where a higher score represents better naturalness and coherence of the semantics.

Optionally, in a different embodiment, the parsing unit may set a scoring threshold, score various combinations of the semantics of the first text according to the predetermined scoring rule, and in the semantics of the at least two first texts, use semantics, with a highest score, of the first text and exceeds a preset threshold as the first target semantics.

In an embodiment, if there is only one piece of semantics with a highest score, for example, "Old Hu is online", the parsing unit uses the semantics of the first text as the first target semantics.

In another embodiment, when no first text has a semantics score exceeding the predetermined threshold, or when two or more first texts have a semantics score exceeding the predetermined threshold, the parsing unit may feed back, to the speech recognizing unit of the interaction device according to a context, a command indicating that more information needs to be input. As described in the foregoing embodiment, after the scoring, the semantics "online" does not meet the scoring threshold of the semantics. The parsing unit analyzes, according to a context of the semantics, that "online" is closely related to text communication and speech communication, that is, feeds back a command to the speech recognizing unit, for example, "Do you hope to have online speech communication or online text communication". The speech recognizing unit may feed back the command to the user by means of speech or text, so that the user inputs more requirements. For example, the user answers "speech", and therefore a "speech" requirement is added; and the parsing unit uses "speech" and "online" as the first target semantics.

Optionally, in a different embodiment, when the interaction device converts the first speech signal, obtains only one first text, and sends the first text to the server, the server directly determines the first target semantics by using semantics of the first text, and further executes the step S63 and subsequent steps.

S63. The server determines, according to the first target semantics, a third-party application object corresponding to the first target semantics.

The determining unit determines a related task according to the selected first target semantics, for example, a task corresponding to "online" is a social task; and the starting unit needs to start a corresponding third-party application, such as QQ and/or Skype. For ease of description, in this specification, a candidate third-party application is referred to as a third-party application object. The determining unit may select at its own, based on an association relationship between predefined semantics and a third-party application or according to use frequency of a third-party application, to determine a third-party application object by using the first target semantics, which is not limited in the present invention.

In an embodiment, only one third-party application object corresponding to the first target semantics is determined according to the first target semantics, for example, instant messaging software Skype.

In another embodiment, the server may further include a sending unit and a receiving unit. If the number of determined third-party application objects is greater than or equal to two, the server acquires information about all third-party application objects that are associated with the first target semantics; the sending unit sends prompt information, where the prompt information includes the information about the third-party application objects and is used to prompt the user to further send, according to the information about the third-party application objects, a selection instruction, so that the determining unit selects a target third-party application object from all the third-party application objects that are associated with the first target semantics; and the receiving unit receives the selection instruction, and the determining unit selects a corresponding target third-party application object according to the selection instruction; correspondingly, the starting unit acquires a third-party application that is associated with the target third-party application object and starts the third-party application.

If at least two third-party application objects are found according to the first target semantics, for example, the instant messaging software Skype and social messaging software QQ, the processing unit may feed back, to the speech recognizing unit according to a context, a command indicating that more information needs to be input; the processing unit feeds back a command to the speech recognizing unit, for example, "Do you hope to have instant communication by Skype or social communication by QQ". The speech recognizing unit may feed back the command to the user by means of speech or text, so that the user inputs more requirements. For example, the user answers "Skype", and therefore the parsing unit uses "Skype" as second target semantics. Next, the determining unit determines, according to the second target semantics, that a target third-party application object is the instant messaging software Skype.

S64. The server acquires, from a third-party application registry, a third-party application that is associated with the determined third-party application object, starts the third-party application, and sends a response feedback to the interaction device.

The starting unit of the server may alternatively accesses a storage unit of the server or a storage unit of the interaction device, find a determined third-party application according to a third-party application registration information table, and start the third-party application.

After determining a specific third-party application, the starting unit accesses the storage unit. The storage unit of the interaction device stores a third-party application registration information table, and the storage unit of the server stores a third-party application and a third-party application registration information table. Different from a default application registry that is provided with the interaction device before delivery, a third-party application registration information table may be generated when a third-party application is installed, and may also be generated when the interaction device is powered on after the third-party application is installed. In this embodiment, when the third-party application registration information table is stored in the storage unit of the interaction device, the starting unit of the server needs to access the storage unit of the interaction device to acquire a third-party application and start the third-party application.

S65. The interaction device receives the response feedback sent by the server.

After the starting unit of the server starts the third-party application, the sending unit sends a semantics command of the first target semantics to the third-party application, so that the third-party application invokes, according to the semantics command of the first target semantics, an API (Application Programming Interface) that matches the started third-party application, and acquires a required hardware and/or software resource by using the API.

Optionally, after the third-party application is started, the third-party application receives a semantics command of the parsing unit, and completes a corresponding operation according to the semantics command. For example, after the third-party application QQ is started, the parsing unit sends a semantics command to QQ, where the command may also be transferred by a predefined API; after receiving the command, QQ searches a buddy list of QQ for a status of a communication object, that is, a friend whose name is "Old Hu", and feeds back the status information to the parsing unit; and the parsing unit translates the status information into corresponding semantics, and outputs the semantics to the user by using the speech recognizing unit of the interaction device, for example, finally outputs, for example, "Old Hu is not online" in a form of speech information to notify the user. In this process, the third-party application may require a user authentication, and a user account and a password are required to be input, where this kind of information is fed back by the third-party application to the user by using the sending unit of the server and the speech recognizing unit of the interaction device; and the user inputs a corresponding account and password by means of speech or keyboard.

Text information interacted between the foregoing units such as the speech recognizing unit and the parsing unit may be decoded code and may be presented to the user in a form of speech or onscreen text.

According to this embodiment of the present invention, with a speech recognition function, a third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

Optionally, in another sixth embodiment, a difference between this embodiment and the fourth and fifth embodiments lies in that a third-party application itself also supports a speech recognition function and can execute a related operation according to speech input of a user. Therefore, processes of recognizing and starting a corresponding third-party application according to a speech signal of the user in the sixth embodiment are the same as that in the fourth embodiment, refer to the fifth embodiment, and for brevity, details are not repeatedly described herein. A difference lies in a process of executing a task by the third-party application after the third-party application is started in the sixth embodiment.

After the third-party application is started, because the third-party application itself has the speech recognition function, it can directly receive a speech signal of the user, and execute a related operation according to the command. The third-party application receives the speech signal of the user, converts the speech signal to obtain a text, completes parsing of semantics of the text, and executes a task corresponding to the semantics. The third-party application implements semantic analysis and task execution by using a third-party server corresponding to the third-party application. When according to a semantics command of the text, the third-party application needs to invoke a resource of an interaction device, the third-party application contacts the interaction device by using an API defined by an operating system of the interaction device, and starts the related resource, for example, invokes a camera and a microphone to perform video communication. In this case, if the third-party application started by the interaction device is QQ, and a corresponding third-party server is, for example, a server of Tencent, communication between the third-party application and the third-party server may be a private interface and a protocol that are defined by a third party itself. If the third-party application is a map and the third-party application needs to invoke GPS information of the interaction device, address information of the interaction device can be queried by using a corresponding API, and for specific map information, corresponding map information can be acquired by the third-party application by accessing a third-party server of the third-party application.

Figure 7:
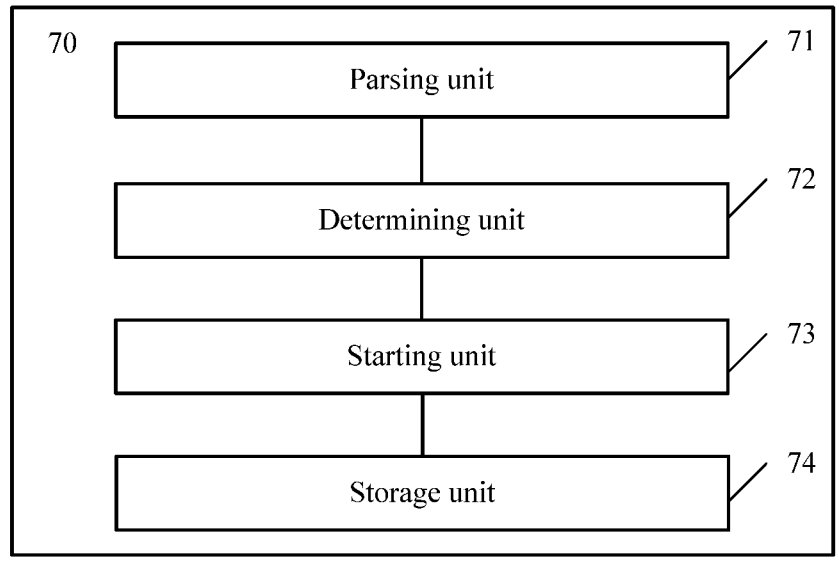
FIG. 7 is a schematic block diagram of an interaction device for speech recognition according to a seventh embodiment of the present invention.

FIG. 7 is a schematic block diagram of an interaction device 70 for speech recognition according to a seventh embodiment of the present invention. The interaction device 70 may include a parsing unit 71, a determining unit 72, a starting unit 73, a storage unit 74, and the like. For example, the interaction device may be an apparatus such as a mobile terminal or a tablet computer (Tablet PC).

The parsing unit 71 parses one or more first texts to obtain first target semantics, where the first text is obtained through conversion from a first speech signal.

The determining unit 72 determines, according to the first target semantics acquired by the parsing unit, a third-party application object corresponding to the first target semantics, where a third-party application that is associated with the third-party application object is a program that is not authorized to start by means of speech before delivery of a device.

The starting unit 73 accesses the storage unit, acquires, from a third-party application registry stored by the storage unit, a third-party application that is associated with the determined third-party application object, and starts the third-party application.

The storage unit 74 stores the third-party application registry and the third-party application.

The interaction device 70 can execute the speech recognition method in the first embodiment of the present invention. The details are not repeatedly described herein.

According to this embodiment of the present invention, with a speech recognition function, a third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

Figure 8:
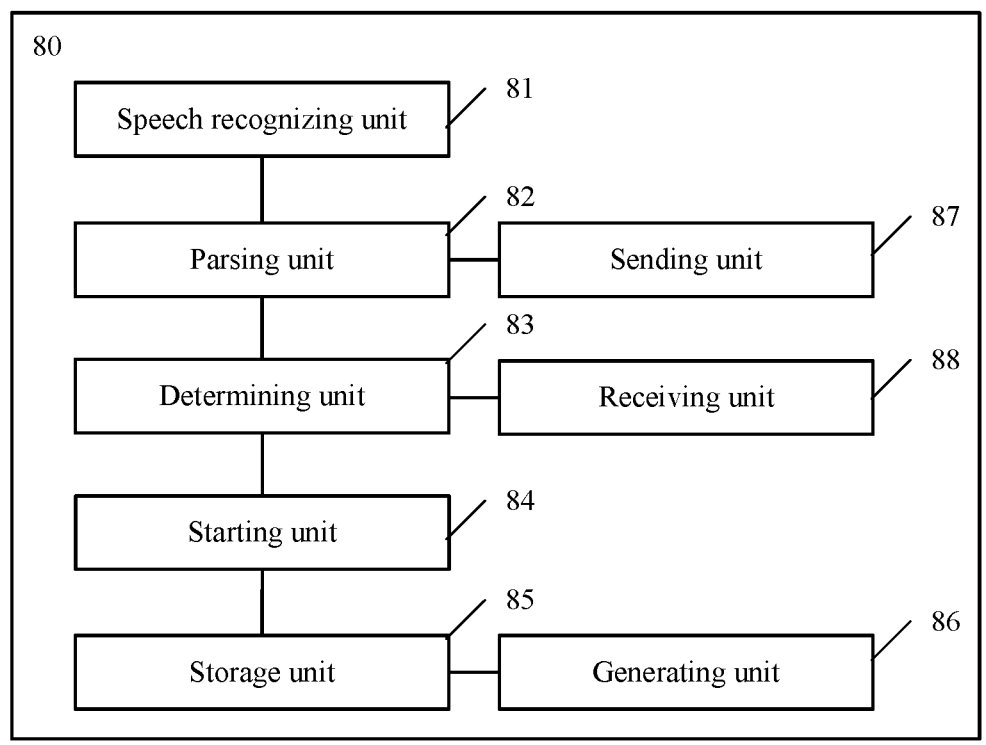
FIG. 8 is a schematic block diagram of an interaction device for speech recognition according to an eighth embodiment of the present invention.

FIG. 8 is a schematic block diagram of an interaction device 80 for speech recognition according to an eighth embodiment of the present invention. The interaction device 80 includes a speech recognizing unit 81, a parsing unit 82, a determining unit 83, a starting unit 84, a storage unit 85 and a generating unit 86, and a sending unit 87 and a receiving unit 88. The parsing unit 82, the determining unit 83, the starting unit 84, and the storage unit 85 of the interaction device 80 are the same as or similar to the parsing unit 71, the determining unit 72, the starting unit 73, and the storage unit 74 of the interaction device 70. A difference lies in that the interaction device 80 further includes the speech recognizing unit 81, the generating unit 86, the sending unit 87, and the receiving unit 88.

The speech recognizing unit 82 converts a first speech signal to obtain one or more first texts and sends the one or more first texts to the parsing unit 82.

Before the interaction device acquires, from a third-party application registry, a third-party application that is associated with a determined third-party application object and starts the third-party application, the generating unit 86 generates the third-party application registry and sends the third-party application registry to the storage unit 85.

The parsing unit 82 specifically converts the first speech signal to obtain at least two first texts, scores semantics of each first text of the at least two first texts according to a predetermined scoring rule and according to naturalness and coherence of the semantics of the at least two first texts, where a higher score represents better naturalness and coherence of the semantics, and acquires, from the semantics of the at least two first texts, semantics with a highest score and of the first text as the first target semantics.

The parsing unit 82 specifically acquires, from the semantics of the at least two first texts, semantics, with a highest score, of the first text and exceeds a preset threshold as the first target semantics.

The determining unit 83 specifically determines, according to the first target semantics, all third-party application objects corresponding to the first target semantics, and if the number of the third-party application objects is greater than or equal to two, acquires information about all the third-party application objects that are associated with the first target semantics; the sending unit 87 sends prompt information, where the prompt information includes the information about the third-party application objects and is used to prompt a user to further send, according to the information about the third-party application objects, a selection instruction, so that the determining unit 83 selects a target third-party application object from all the third-party application objects that are associated with the first target semantics; the receiving unit 88 receives the selection instruction, and the determining unit 83 specifically selects a corresponding target third-party application object according to the received selection instruction; and the starting unit specifically acquires, from the third-party application registry stored by the storage unit, a third-party application that is associated with the target third-party application object and starts the third-party application.

The speech recognizing unit 81 further converts, when the selection instruction is a second speech signal, the second speech signal to obtain a second text and sends the second text to the parsing unit 82; the parsing unit 82 further parses the second text to acquire second target semantics; and the determining unit 83 determines a corresponding target third-party application object according to the second target semantics.

After starting the third-party application, the starting unit 84 further sends a semantics command of the first target semantics to the third-party application, so that the third-party application invokes, according to the semantics command of the first target semantics, a third-party application interface API that matches the started third-party application.

The interaction device 80 implements the speech recognition method in the first, second, or third embodiment of the present invention. For brevity, details are not repeatedly described herein.

According to this embodiment of the present invention, with a speech recognition function, a third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

Figure 9:
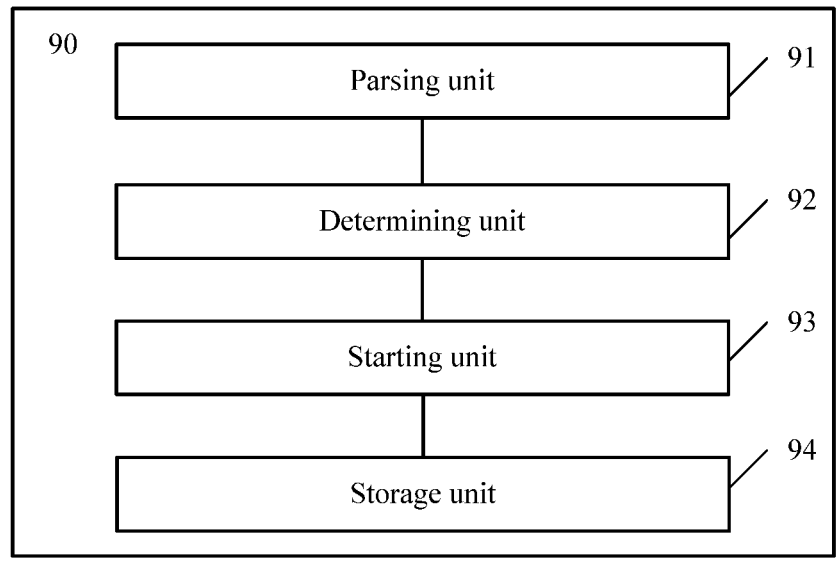
FIG. 9 is a schematic block diagram of a server for speech recognition according to a ninth embodiment of the present invention.

FIG. 9 is a schematic block diagram of a server 90 for speech recognition according to a ninth embodiment of the present invention. The server 90 includes a parsing unit 91, a determining unit 92, a starting unit 93, a storage unit 94, and the like. The server 90 provides support service for an interaction device.

The parsing unit 91 parses one or more first texts to obtain first target semantics, where the first text is obtained through conversion from a first speech signal.

The determining unit 92 determines, according to the first target semantics acquired by the parsing unit, a third-party application object corresponding to the first target semantics, where a third-party application that is associated with the third-party application object is a program that is not authorized to start by means of speech before delivery of a device.

The starting unit 93 acquires, from a third-party application registry stored by the storage unit 92, a third-party application that is associated with the determined third-party application object and starts the third-party application.

The storage unit 92 stores the third-party application registry and the third-party application.

The server 90 implements the speech recognition method in the first embodiment of the present invention. For brevity, the details are not repeatedly described herein.

According to this embodiment of the present invention, with a speech recognition function, a third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

Figure 10:
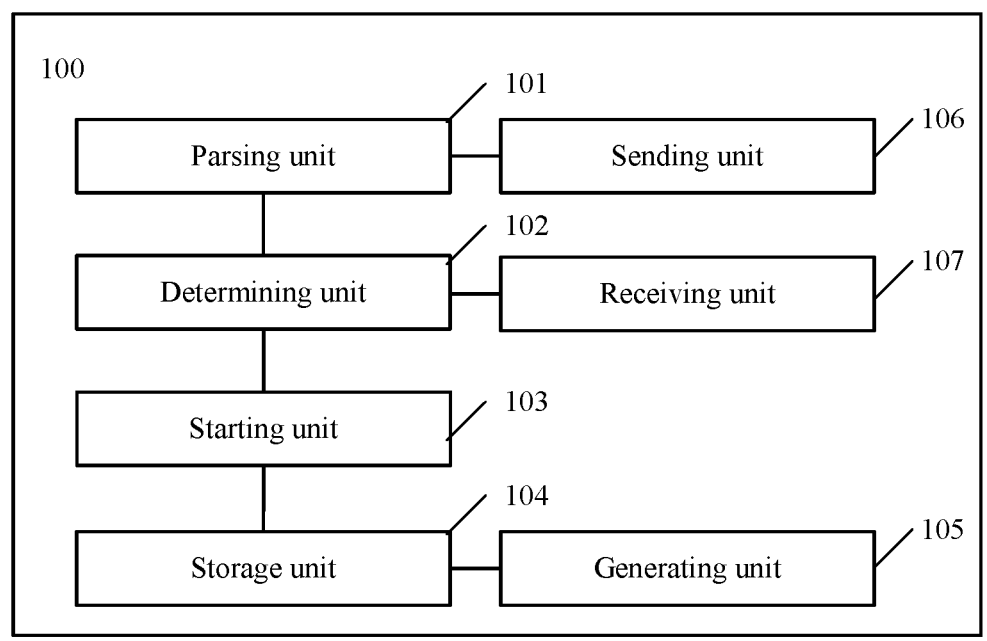
FIG. 10 is a schematic block diagram of a server for speech recognition according to a tenth embodiment of the present invention.

FIG. 10 is a schematic block diagram of a server 100 for speech recognition according to a tenth embodiment of the present invention. The server 100 includes a parsing unit 101, a determining unit 102, a starting unit 103, a storage unit 104 and a generating unit 105, a sending unit 106 and a receiving unit 107, and the like. The parsing unit 101, the determining unit 102, the starting unit 103, and the storage unit 104 of the server 100 are the same as or similar to the parsing unit 91, the determining unit 92, the starting unit 93, and the storage unit 94 of the server 90. A difference lies in that the server 100 further includes the generating unit 105, the sending unit 106, and the receiving unit 107.

Before the server acquires, from a third-party application registry, a third-party application that is associated with a determined third-party application object and starts the third-party application, the generating unit 105 generates the third-party application registry and sends the third-party application registry to the storage unit 104.

The parsing unit 101 specifically scores, according to a predetermined scoring rule and according to naturalness and coherence of semantics of at least two first texts that are obtained through conversion from a first speech signal, semantics of each first text of the at least two first texts, where a higher score represents better naturalness and coherence of the semantics, and acquires, from the at least two first texts, semantics with a highest score and of the first text as the first target semantics.

The parsing unit 101 specifically acquires, from the semantics of the at least two first texts, semantics, with a highest score, of the first text and exceeds a preset threshold as the first target semantics.

The determining unit 102 further determines, according to the first target semantics, all third-party application objects corresponding to the first target semantics, and if the number of the third-party application objects is greater than or equal to two, acquires information about all the third-party application objects that are associated with the first target semantics; the sending unit 106 sends prompt information, where the prompt information includes the information about the third-party application objects and is used to prompt a user to further send, according to the information about the third-party application objects, a selection instruction, so that the determining unit 101 selects a target third-party application object from all the third-party application objects that are associated with the first target semantics; the receiving unit 107 receives the selection instruction, and the determining unit 101 selects a corresponding target third-party application object according to the received selection instruction; and the starting unit 103 acquires, from the third-party application registry stored by the storage unit 104, a third-party application that is associated with the target third-party application object and starts the third-party application.

The parsing unit 101 further parses, when the selection instruction is a second speech signal, the second text to acquire second target semantics, where the second text is obtained through conversion from the second speech signal; and the determining unit 102 determines a corresponding target third-party application object according to the second target semantics.

After starting the third-party application, the starting unit 103 further sends a semantics command of the first target semantics to the third-party application, so that the third-party application invokes, according to the semantics command of the first target semantics, a third-party application interface API that matches the started third-party application.

After the starting unit 103 starts the third-party application, so that the third-party application converts the third speech signal to obtain a third text, and invokes, according to a semantics command of the third text, a third-party application interface API that matches the started third-party application, so that the started third-party application acquires a required hardware or software resource by using the API.

The receiving unit 107 further receives, before a first text is parsed to obtain the first target semantics, the first text sent by an interaction device.

The sending unit 106 sends a response feedback to the interaction device after the third-party application is started.

The server 100 implements the speech recognition method in the first, fifth, or sixth embodiment of the present invention. For brevity, details are not repeatedly described herein.

According to this embodiment of the present invention, with a speech recognition function, a third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

Figure 11:
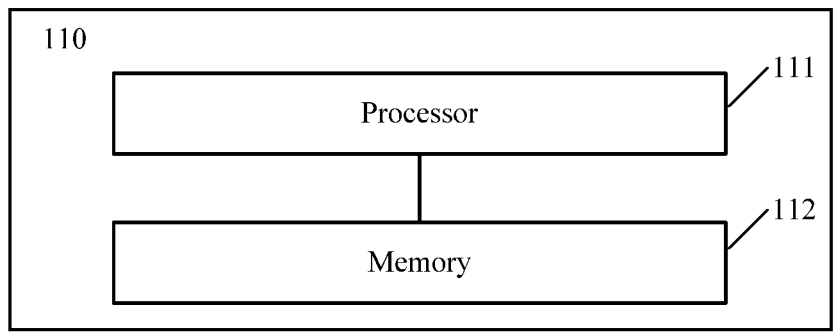
FIG. 11 is a schematic block diagram of an apparatus for speech recognition according to an eleventh embodiment of the present invention.

FIG. 11 is a schematic block diagram of an apparatus 110 for speech recognition according to an eleventh embodiment of the present invention. The apparatus 110 includes a processor 111, a memory 112, and the like.

The memory 112 may include a RAM and a ROM, or any fixed storage medium or portable storage medium, which is configured to store a program that can execute embodiments of the present invention, data to be processed in the embodiments of the present invention, a third-party application, or the like.

The processor 111 is configured to execute a program, which is stored by the memory 112, of the embodiments of the present invention and perform bidirectional communication with another apparatus by using, for example, a bus.

In an implementation manner of the apparatus 110, the processor 111 parses one or more first texts to obtain first target semantics, where the first text is obtained through conversion from a first speech signal; determines, according to the acquired first target semantics, a third-party application object corresponding to the first target semantics, where a third-party application that is associated with the third-party application object is a program that is not authorized to start by means of speech before delivery of a device; and accesses the memory, acquires, from a third-party application registry stored by the memory, a third-party application that is associated with the determined third-party application object, and starts the third-party application. The memory 112 stores the third-party application registry and the third-party application, and the processor 111 executes an instruction of the foregoing method.

When the apparatus 110 may further include a device or a module that collects speech signals, for example, a microphone, the processor 111 converts a first speech signal collected by the microphone or the like to obtain one or more first texts.

In addition, the processor 111 specifically converts the first speech signal to obtain at least two first texts, scores semantics of each first text of the at least two first texts according to a predetermined scoring rule and according to naturalness and coherence of the semantics of the at least two first texts, where a higher score represents better naturalness and coherence of the semantics, and acquires, from the semantics of the at least two first texts, semantics with a highest score and of the first text as the first target semantics.

The processor 111 specifically acquires, from the semantics of the at least two first texts, semantics, with a highest score, of the first text and exceeds a preset threshold as the first target semantics.

The processor 111 further determines, according to the first target semantics, all third-party application objects corresponding to the first target semantics; and if the number of the third-party application objects is greater than or equal to two, acquires information about all the third-party application objects that are associated with the first target semantics; sends prompt information, where the prompt information includes the information about the third-party application objects and is used to prompt a user to further send, according to the information about the third-party application objects, a selection instruction, so as to select a target third-party application object from all the third-party application objects that are associated with the first target semantics; receives the selection instruction, selects a corresponding target third-party application object according to the received selection instruction; and acquires, from the third-party application registry stored by the memory 112, a third-party application that is associated with the target third-party application object and starts the third-party application.

The processor 111 further converts, when the selection instruction is a second speech signal, the second speech signal to obtain a second text, parses the second text to acquire second target semantics, and determines a corresponding target third-party application object according to the second target semantics.

Before acquiring, from the third-party application registry, the third-party application that is associated with the determined third-party application object and starting the third-party application, the processor 111 generates the third-party application registry.

After starting the third-party application, the processor 111 further sends a semantics command of the first target semantics to the third-party application, so that the third-party application invokes, according to the semantics command of the first target semantics, a third-party application interface API that matches the started third-party application.

Before the apparatus 110 acquires, from the third-party application registry, the third-party application that is associated with the determined third-party application object and starts the third-party application, the processor 111 generates the third-party application registry and sends the third-party application registry to the memory 112.

In another implementation manner, when the apparatus 110 does not include a device or a module that collects speech signals, for example, a microphone, the processor 111 further receives, before parsing a first text to obtain first target semantics, the first text sent by another apparatus; parses the first text to obtain the first target semantics, where optionally, the first text is obtained through conversion from a first speech signal and at least two first texts are obtained; determines, according to the acquired first target semantics, a third-party application object corresponding to the first target semantics; and acquires, from a third-party application registry stored by the memory 112, a third-party application that is associated with the determined third-party application object and starts the third-party application. The memory 112 stores the third-party application registry and the third-party application, and the processor 111 executes an instruction of the foregoing method.

The processor 111 generates, when a third-party application is installed on the apparatus 1100 or after the apparatus 110 is powered on, the third-party application registry and sends the third-party application registry to the memory 112.

The processor 111 specifically scores, according to a predetermined scoring rule and according to naturalness and coherence of the semantics of at least two first texts that are obtained through conversion from the first speech signal, semantics of each first text of the at least two first texts, where a higher score represents better naturalness and coherence of the semantics; and acquires, from the semantics of the at least two first texts, semantics with a highest score and of the first text whose score as the first target semantics.

The processor 111 specifically acquires, from the semantics of the at least two first texts, semantics, with a highest score, of the first text and exceeds a preset threshold as the first target semantics.

The processor 111 further determines, according to the first target semantics, all third-party application objects corresponding to the first target semantics; and if the number of the third-party application objects is greater than or equal to two, acquires information about all the third-party application objects that are associated with the first target semantics; sends prompt information, where the prompt information includes the information about the third-party application objects and is used to prompt a user to further send, according to the information about the third-party application objects, a selection instruction, so as to select a target third-party application object from all the third-party application objects that are associated with the first target semantics; receives the selection instruction, selects the corresponding target third-party application object according to the received selection instruction; and acquires, from the third-party application registry stored by the memory 112, a third-party application that is associated with the target third-party application object and starts the third-party application.

The processor 111 further parses, when the selection instruction is a second speech signal, the second text to acquire second target semantics, where the second text is obtained through conversion from the second speech signals; and determines a corresponding target third-party application object according to the second target semantics.

After starting the third-party application, the processor 111 further sends a semantics command of the first target semantics to the third-party application, so that the third-party application invokes, according to the semantics command of the first target semantics, a third-party application interface API that matches the started third-party application.

After the processor 111 starts the third-party application, so that the third-party application converts the third speech signal to obtain a third text, and invokes, according to a semantics command of the third text, a third-party application interface API that matches the started third-party application, so that the started third-party application acquires a required hardware or software resource by using the API.

After starting the third-party application, the processor 111 sends a response feedback to the another apparatus.

The apparatus 110 implements the speech recognition method in the first, second, third, fifth, or sixth embodiment of the present invention, and as a specific implementation form, it may be, for example, a mobile terminal, a tablet computer, or a server.

According to this embodiment of the present invention, with a speech recognition function, a third-party application corresponding to a speech signal of a user can be determined according to the speech signal and by means of semantic analysis; and third-party application registry information is searched for and a third-party program is started, so that the user does not need to tap the third-party application to start the corresponding program, thereby providing more intelligent service for the user and facilitating use for the user.

An embodiment of the present invention further provides a system for speech recognition, which may include any one apparatus of the apparatus 110, the interaction device 70, the interaction device 80, the server 90, and the server 100 in the foregoing embodiments. For brevity, details are not repeatedly described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A speech recognition method performed by a processor, the method comprising:
   parsing one or more first texts to obtain first target semantics, wherein the one or more first texts is or are obtained through conversion from a first speech signal;
   determining, according to the obtained first target semantics, a third-party application object associated with the first target semantics, wherein a third-party application that is associated with the third-party application object is a program that is not authorized to start by speech in a device from its original producer; and
   acquiring, from a third-party application registry, the third-party application, and starting the third-party application.

2. The method according to claim 1, wherein before parsing the one or more first texts to obtain the first target semantics, the method further comprises:
   acquiring first speech signals and converting the first speech signals to obtain the one or more first texts.

3. The method according to claim 2, wherein converting the first speech signals to obtain the one or more first texts comprises:
   converting the first speech signals to obtain at least two first texts; and
   wherein parsing the one or more first texts to obtain the first target semantics comprises:
   scoring semantics of each first text of the at least two first texts according to (a) a predetermined scoring rule and (b) naturalness and coherence of the semantics of the at least two first texts, wherein a higher score represents better naturalness and coherence of the semantics; and
   acquiring, from the semantics of the at least two first texts, semantics with a highest score of a first text as the first target semantics.

4. The method according to claim 3, wherein acquiring, from the semantics of the at least two first texts, the semantics with the highest score of the first text as the first target semantics comprises:
   acquiring, from the semantics of the at least two first texts, the semantics, with the highest score of the first text and exceeding a preset threshold as the first target semantics.

5. The method according to claim 1, wherein determining, according to the acquired the first target semantics, the third-party application object associated with the first target semantics comprises:
   determining, according to the first target semantics, all third-party application objects associated with the first target semantics;
   when a plurality of the third-party application objects is greater than or equal to two, acquiring information about all the third-party application objects that are associated with the first target semantics;
   sending prompt information, wherein the prompt information comprises the information about the third-party application objects and is used to prompt a user to send, a selection instruction, according to the information about the third-party application objects; and
   receiving the selection instruction from the user, and selecting a target third-party application object from all the third-party application objects according to the selection instruction; and
   wherein acquiring, from the third-party application registry, the third-party application that is associated with the determined third-party application object and starting the third-party application comprises:
   acquiring, from the third-party application registry, a target third-party application that is associated with the target third-party application object and starting the target third-party application.

6. The method according to claim 5, wherein the selection instruction is a second speech signal; and
   wherein selecting the target third-party application object according to the received selection instruction comprises:
   converting the second speech signal to obtain a second text;
   parsing the second text to acquire second target semantics; and
   determining the target third-party application object according to the second target semantics.

7. The method according to claim 1, wherein before acquiring, from the third-party application registry, the third-party application that is associated with the determined third-party application object and starting the third-party application, the method further comprises:
generating the third-party application registry.

8. The method according to claim 1, wherein after starting the third-party application, the method further comprises:
sending a semantics command of the first target semantics to the started third-party application, so that the started third-party application invokes, according to the semantics command of the first target semantics, a third-party application interface (API) that matches the started third-party application, and the started third-party application acquires a required hardware or software resource by using the API.

9. The method according to claim 1, wherein after starting the third-party application, the method further comprises:
receiving, by the started third-party application, a third speech signal of the user;
converting the third speech signal to obtain a third text; and
invoking, according to a semantics command of the third text, a third-party application interface (API) that matches the started third-party application, so that the started third-party application acquires a required hardware or software resource by using the API.

10. The method according to claim 1, wherein the method is executed by an interaction device.

11. The method according to claim 1, wherein:
a server executes the process of parsing the one or more first texts to obtain the first target semantics; and
an interaction device executes the process of determining, according to the acquired first target semantics, the third-party application object associated with the first target semantics, and the process of acquiring, from the third-party application registry, the third-party application that is associated with the determined third-party application object and starting the third-party application.

12. An interaction device for speech recognition, wherein the interaction device comprises a processor and a memory coupled to the processor and having computer-executable instructions stored thereon, which when executed cause the processor to implement operations including:
parsing one or more first texts to obtain first target semantics, wherein the one or more first texts is or are obtained through conversion from a first speech signal;
determining, according to the first target semantics obtained by the parsing unit, a third-party application object associated with the first target semantics, wherein a third-party application that is associated with the third-party application object is a program that is not authorized to start by speech in a device from its original producer;
acquiring, from a third-party application registry, the third-party application, and start the third-party application; and
storing the third-party application registry and the third-party application.

13. The interaction device according to claim 12, wherein the operations further include:
converting the first speech signals to obtain and send the one or more first texts.

14. The interaction device according to claim 12, wherein the operations further include:
converting the first speech signals to obtain and send at least two first texts; and
scoring semantics of each first text of the at least two first texts according to (a) a predetermined scoring rule and (b) naturalness and coherence of the semantics of the at least two first texts, wherein a higher score represents better naturalness and coherence of the semantics; and
acquiring, from the semantics of the at least two first texts, semantics with a highest score of a first text as the first target semantics.

15. The interaction device according to claim 14, wherein the operations further include:
acquiring, from the semantics of the at least two first texts, the semantics, with the highest score of the first text and exceeding a preset threshold as the first target semantics.

16. The interaction device according to claim 12, wherein the operations further include:
determining, according to the first target semantics, all third-party application objects associated with the first target semantics, and when a plurality of the third-party application objects is greater than or equal to two, acquire information about all the third-party application objects that are associated with the first target semantics;
sending prompt information, wherein the prompt information comprises the information about the third-party application objects and is used to prompt a user to send, a selection instruction, according to the information about the third-party application objects;
receiving the selection instruction sent by the user;
selecting a target third-party application object from all the third-party application objects according to the received selection instruction; and
acquiring, from the third-party application registry, a target third-party application that is associated with the target third-party application object and starting the target third-party application.

17. The interaction device according to claim 16, wherein the operations further include:
when the selection instruction is a second speech signal, converting the second speech signal to obtain and send a second text; and
parsing the second text to acquire second target semantics; and
determining the target third-party application object according to the second target semantics.

18. The interaction device according to claim 12, wherein the operations further include:
before acquiring, from the third-party application registry, the third-party application that is associated with the determined third-party application object and starting the third-party application, generating and sending the third-party application registry.

19. The interaction device according to claim 12, wherein the operations further include:
after starting the third-party application, sending a semantics command of the first target semantics to the started third-party application, so that the started third-party application invokes, according to the semantics command of the first target semantics, a third-party application interface (API) that matches the started third-party application.

20. A non-transitory computer-readable medium, comprising processor-executable instructions, which when executed by a processor of a server, cause the processor to implement operations including:

parsing one or more first texts to obtain first target semantics, wherein the one or more first texts is or are obtained through conversion from a first speech signal;

determining, according to the first target semantics, a third-party application object associated with the first target semantics, wherein a third-party application that is associated with the third-party application object is a program that is not authorized to start by speech in a device from its original producer;

acquiring, from a third-party application registry, a third-party application that is associated with the third-party application object, and starting the third-party application; and storing the third-party application registry and the third-party application.

21. The non-transitory computer-readable medium according to claim 20, wherein the operations further include:

scoring, according to (a) a predetermined scoring rule and (b) naturalness and coherence of semantics of at least two of the first texts that are obtained through conversion from the first speech signal, semantics of each first text of the at least two first texts, wherein a higher score represents better naturalness and coherence of the semantics; and acquire, from the semantics of the at least two first texts, semantics with a highest score of the first text as the first target semantics.

22. The non-transitory computer-readable medium according to claim 21, wherein the operations further include:

acquiring, from the semantics of the at least two first texts, the semantics, with the highest score of the first text and exceeding a preset threshold as the first target semantics.

23. The non-transitory computer-readable medium according to claim 20, wherein the operations further include:

determining, according to the first target semantics, all third-party application objects associated with the first target semantics, and when plurality of the third-party application objects is greater than or equal to two, acquire information about all the third-party application objects that are associated with the first target semantics;

sending prompt information, wherein the prompt information comprises the information about the third-party application objects and is used to prompt a user to send, a selection instruction, according to the information about the third-party application objects;

receiving the selection instruction sent by the user; and selecting a target third-party application object from all the third-party application objects according to the received selection instruction; and acquiring, from the third-party application registry, a target third-party application that is associated with the target third-party application object and starting the target third-party application.

24. The non-transitory computer-readable medium according to claim 23, wherein the operations further include:

when the selection instruction is a second speech signal, parsing the second text to acquire second target semantics, wherein the second text is obtained through conversion from the second speech signals; and determining the target third-party application object according to the second target semantics.

25. The non-transitory computer-readable medium according to claim 20, wherein the operations further include:

before acquiring, from the third-party application registry, the third-party application that is associated with the determined third-party application object and starting the third-party application, generating and sending the third-party application registry.

26. The non-transitory computer-readable medium according to claim 20, wherein the operations further include:

after starting the third-party application, sending a semantics command of the first target semantics to the started third-party application, so that the started third-party application invokes, according to the semantics command of the first target semantics, a third-party application interface (API) that matches the started third-party application.

27. The non-transitory computer-readable medium according to claim 20, wherein the operations further include:

after starting the third-party application, converting the third speech signal to obtain a third text, and invoking, according to a semantics command of the third text, a third-party application interface (API) that matches the started third-party application, so that the started third-party application acquires a required hardware or software resource by using the API.

28. The non-transitory computer-readable medium according to claim 20, wherein the operations include:

receiving, before the first text is parsed to obtain the first target semantics, the first text sent by an interaction device.

29. The non-transitory computer-readable medium according to claim 20, wherein the operations include:

sending a response feedback to the interaction device after the third-party application is started.

* * * * *